United States Patent
Kumar et al.

(10) Patent No.: US 10,974,607 B2
(45) Date of Patent: Apr. 13, 2021

(54) POWER SYSTEM AND ASSOCIATED SYSTEM

(71) Applicant: General Electric Company, Schenectady, NY (US)

(72) Inventors: Ajith Kuttannair Kumar, Erie, PA (US); Govardhan Ganireddy, Roanoke, VA (US); Shahid Ali, Bangalore (IN); Prashanth Manikumar Chennamsetty, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 318 days.

(21) Appl. No.: 15/643,537

(22) Filed: Jul. 7, 2017

(65) Prior Publication Data
US 2019/0009690 A1 Jan. 10, 2019

(51) Int. Cl.
*B60L 15/00* (2006.01)
*B60L 9/16* (2006.01)
(Continued)

(52) U.S. Cl.
CPC ............ *B60L 15/002* (2013.01); *B60L 9/16* (2013.01); *B60L 15/32* (2013.01); *B61C 3/00* (2013.01);
(Continued)

(58) Field of Classification Search
CPC ... H02J 3/46; H02J 3/01; B60L 15/002; B60L 9/16; B60L 15/32; B60L 2200/26; B61C 3/00
(Continued)

(56) References Cited

U.S. PATENT DOCUMENTS 5,334,878 A * 8/1994 Vanek ...................... B60L 1/00
307/64
6,381,157 B2 4/2002 Jensen
(Continued)

OTHER PUBLICATIONS

Chandorkar et al., "Control of parallel connected inverters in standalone AC supply systems", IEEE Transactions on Industry Applications, vol. 29, Issue: 1, pp. 136-143, Jan./Feb. 1993.
(Continued)

*Primary Examiner* — Rexford N Barnie
*Assistant Examiner* — Swarna N Chowdhuri
(74) *Attorney, Agent, or Firm* — Mary D. Lawlor; The Small Patent Law Group LLC (57) ABSTRACT

A power system is disclosed. The power system includes a first power generating unit. The first power generating unit includes a first power converting subunit and a first control unit coupled to the first power converting subunit, where the first control unit is configured to regulate a voltage of the first power generating unit. The power system further includes a second power generating unit coupled to the first power generating unit and a load, where the second power generating unit includes a second power converting subunit and a second control unit coupled to the second power converting subunit, wherein the second control unit is configured to control a current of the second power generating unit to share a quantity of electrical output current flowing through the load among the first and second power generating units.

24 Claims, 3 Drawing Sheets

(51) Int. Cl.
*H02J 3/46* (2006.01)
*B61C 3/00* (2006.01)
*B60L 15/32* (2006.01)
*H02J 3/01* (2006.01)

(52) U.S. Cl.
CPC ....... *B60L 2200/26* (2013.01); *B60L 2210/40* (2013.01); *B60L 2240/527* (2013.01); *B60L 2240/529* (2013.01); *H02J 3/01* (2013.01); *H02J 3/46* (2013.01)

(58) Field of Classification Search
USPC .......................................................... 307/9.1
See application file for complete search history.

(56) References Cited

U.S. PATENT DOCUMENTS

| | | | |
|---|---|---|---|
| 7,420,826 B2 | 9/2008 | Tan et al. | |
| 8,421,266 B2* | 4/2013 | Kumar | B60L 15/32 307/9.1 |
| 8,772,962 B2 | 7/2014 | Kumar | |
| 8,787,048 B2 | 7/2014 | Moreno-Casta Eda et al. | |
| 9,018,792 B2* | 4/2015 | Still | B60L 1/003 307/9.1 |
| 9,236,791 B2 | 1/2016 | Kumar et al. | |
| 9,409,482 B2 | 8/2016 | Bachmaier et al. | |
| 9,991,767 B2* | 6/2018 | Jalla | B60L 1/00 |
| 2011/0074320 A1* | 3/2011 | Nakamura | H02P 21/0089 318/400.02 |
| 2014/0139016 A1* | 5/2014 | Lovercheck | B60L 15/2045 307/9.1 |
| 2014/0379180 A1* | 12/2014 | Kral | B61C 7/04 701/19 |
| 2015/0076903 A1* | 3/2015 | Kanayama | H02J 3/40 307/24 |
| 2015/0131345 A1 | 5/2015 | Purhonen et al. | |
| 2016/0072424 A1* | 3/2016 | Yokozutsumi | H02P 21/22 318/503 |
| 2016/0144871 A1* | 5/2016 | Jalla | B60L 1/003 105/27 |
| 2016/0185360 A1 | 6/2016 | Jalla | |
| 2016/0190969 A1* | 6/2016 | Jalla | B60L 50/15 318/494 |
| 2016/0211771 A1* | 7/2016 | Ichihara | H02M 7/493 |
| 2018/0319409 A1* | 11/2018 | Jalla | B60L 1/003 |

OTHER PUBLICATIONS

Guerrero et al., "Output impedance design of parallel-connected UPS inverters with wireless load-sharing control", IEEE Transactions on Industrial Electronics, vol. 52, Issue: 4, pp. 1126-1135, Aug. 2005.

* cited by examiner

POWER SYSTEM AND ASSOCIATED SYSTEM

BACKGROUND

Technical Field

Embodiments of the invention relate to power systems and associated methods.

Discussion of Art

Vehicles may provide power to one or more unpowered trailers, such as, coaches, passenger cars, or carriages. Particularly, the vehicles may supply power to traction motors and non-propulsion electric loads. Power supplied to the traction motors may aid in providing motive force. The non-propulsion loads may include heaters, ventilators, radial fans, coolers, lights, electric circuits for personal use, air conditioners, and the like. The power provided to the non-propulsion electric loads may be referred to as a head end power, hotel load, auxiliary load, and the like.

For certain applications, a plurality of vehicles, may be logically and/or mechanically coupled together. Using rail vehicles as an example, a group of coupled rail vehicles may be referred to as a train and multiple powered units may be referred as a consist. If an exemplary vehicle is a locomotive, there may be both powered and unpowered units, and even multiple powered units, that are employed to form a train. In such a case, one vehicle provides head end power to the non-propulsion electric loads and/or traction motors, while the other powered vehicles provide power only to traction motors.

A practical constraint for suppling power in related circumstances is that an increase in power rating of power electronic components, such as inverters, may result in an increase in weight of the corresponding vehicle. A heavier vehicle may not be practical or required. It may be desirable to have a power system and an associated system that differ from those that are currently available.

BRIEF DESCRIPTION

In accordance with one embodiment of the present invention, a power system is disclosed. The power system includes a first power generating unit. The first power generating unit includes a first power converting subunit and a first control unit coupled to the first power converting subunit, where the first control unit is configured to regulate a voltage of the first power generating unit. The power system further includes a second power generating unit coupled to the first power generating unit and a load, where the second power generating unit includes a second power converting subunit and a second control unit coupled to the second power converting subunit, wherein the second control unit is configured to control a current of the second power generating unit to share a quantity of electrical output current flowing through the load among the first and second power generating units.

In accordance with another embodiment of the present invention, a method of operating a power system is disclosed. The method includes regulating a voltage of a first power generating unit, using a first control unit of the first power generating unit, where a second power generating unit is coupled to the first power generating unit and a load, where the first power generating unit further comprises a first power converting subunit coupled to the first control unit, and where the second power generating unit comprises a second power converting subunit coupled to a second control unit. Further, the method includes controlling a current of the second power generating unit to share a quantity of electrical output current flowing through the load among the first and second power generating units, using the second control unit.

DRAWINGS

These and other features, aspects, and advantages of the disclosure are detailed in the following description. Like characters represent like parts throughout the drawings, wherein.

DETAILED DESCRIPTION

As will be described in detail hereinafter, various embodiments of an exemplary power system and a method of operating the power system are disclosed. The exemplary embodiments disclose parallel operation of power converting subunit of each of the plurality of power generating units of the power system. Each of the plurality of power converting subunit provides electric power to a load. In particular, each of the plurality of power generating units provide a head end power to the load.

Figure 1:
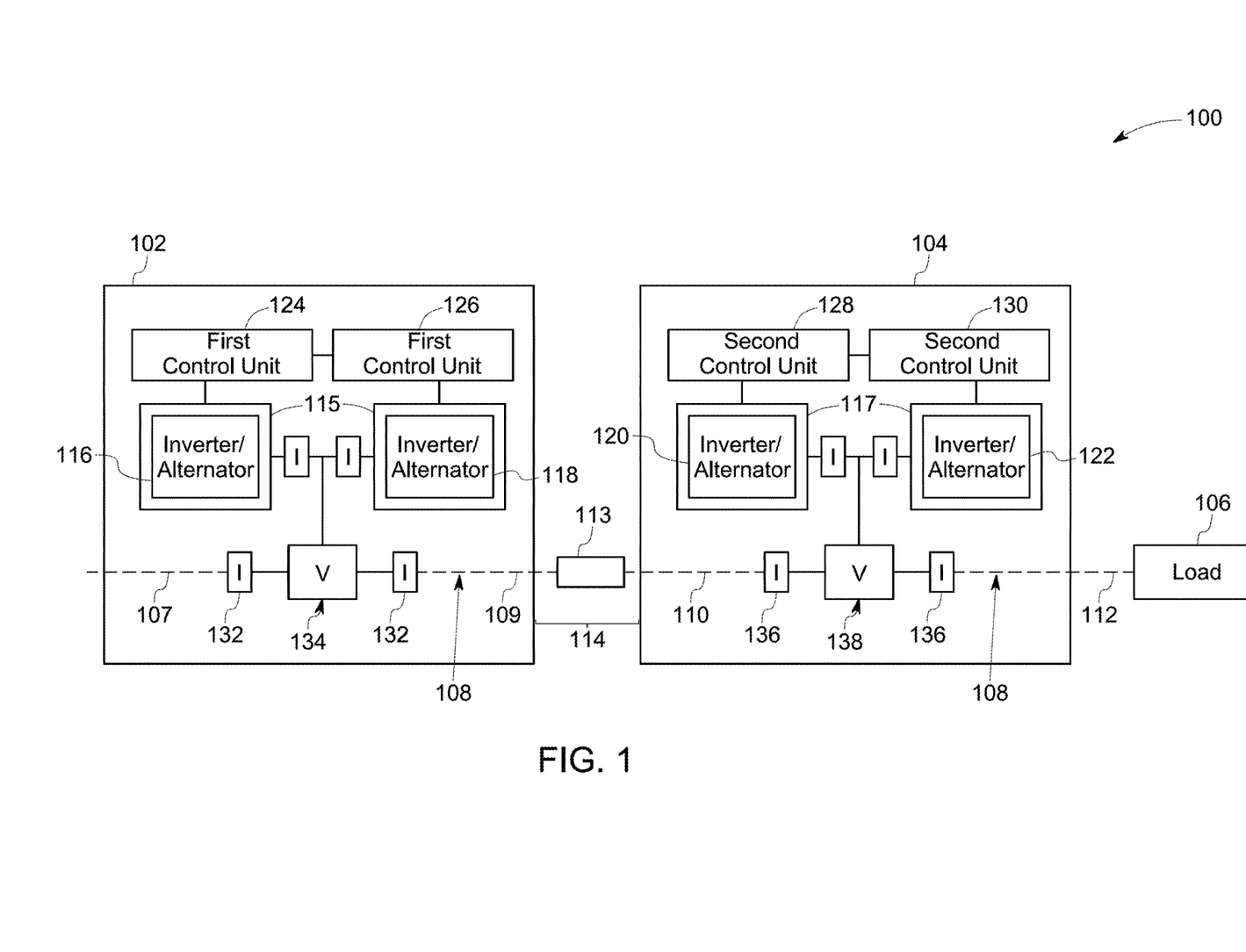
FIG. 1 is a block diagram of a power system in accordance with certain embodiments of the invention.

Turning now to the drawings and by way of example in FIG. 1, a block diagram of a power system 100 in accordance with certain embodiments of the present invention is shown. The exemplary power system 100 may be employed for stationary applications such as uninterruptible power supply based system and mobile applications such as trains, platooned vehicles, and the like.

The terms "train", "platoon" and "consist" as used herein, refer to a plurality of vehicles operatively coupled to one another and/or to a plurality of unpowered vehicles. Powered vehicles include those vehicles that have devices for self-propulsion. Suitable examples may include aircraft, marine vessels, locomotives, on-road trucks, off-road vehicles, mining and industrial equipment, and the like. The self-propelled vehicles may further have one or more power sources to effectuate the propulsion (although others may work by wireless power transfer, catenary lines, and the like). In some applications, such as energy tenders, the vehicle may include a power source but not a means for propulsion that is on the vehicle. In certain other applications, a power source may be a stationary power source (or near stationary in that the power source is primarily intended for operation without moving). Unpowered vehicles are referred to those vehicles that do not include means for propulsion and further do not include own power sources for providing tractive effort. The term "auxiliary load", as used herein, refers to non-propulsion electrical loads placed on a power system. Suitable non-propulsion loads include heating loads, ventilating loads, radial fans, cooling loads, lighting loads, electric circuits for personal use, and the like. The power provided to the non-propulsion loads may be referred to as head end power.

In the illustrated embodiment, the power system 100 includes a first power generating unit 102 and a second power generating unit 104 coupled to each other. In particular, the second power generating unit 104 is coupled to the first power generating unit 102 and to a load 106. More particularly, the first power generating unit 102 is coupled to the load 106 via the second power generating unit 104. In the illustrated embodiment, the first power generating unit 102 is a first vehicle and the second power generating unit 104 is a second vehicle. In one embodiment, the first vehicle and the second vehicle is a locomotive. In this embodiment, the load 106 is a train load. In the one embodiment, the power system 100 is a locomotive power system. It should be noted herein that the terms "first power generating unit" and "first vehicle," may be used interchangeably for the reference numeral 102. Similarly, the terms "second power generating unit" and "second vehicle," may be used interchangeably for the reference numeral 104.

The first and second vehicles 102, 104 are coupled to each other and the load 106 using a head end power (HEP) train line 108. The HEP train line 108 is disposed extending through the first and second vehicles 102, 104 and coupled to the load 106. The term "HEP train line," as used herein, refers to a common electrical line which is used to couple electrical components of different vehicles. Although FIG. 1 shows only two vehicles, the number of vehicles of the power system 100 may vary depending on the application.

In one embodiment, the first vehicle 102 operates as a lead vehicle and the second vehicle 104 operates as a trail vehicle. Further, in one embodiment, the first vehicle 102 and the second vehicle 104 operate at a same frequency. In some other embodiments, the first vehicle operates as a trail vehicle and the second vehicle operates as a lead vehicle.

Reference numerals 107, 109 represent two ends respectively of the first vehicle 102 with reference to the HEP train line 108. Further, reference numerals 110 and 112 represent two ends respectively of the second vehicle 104 with reference to the HEP train line 108. In the illustrated embodiment, where the first vehicle 102 is the lead vehicle and the second vehicle 104 is the trail vehicle, the end 109 of first vehicle 102 is coupled to the end 110 of the second vehicle 104. Furthermore, the end 112 of the second vehicle 104 is coupled to a load 106. Particularly, the first and second vehicles 102, 104 are coupled to the load 106 in such a manner that the combination of the first and second vehicles 102, 104 may provide power to the load 106.

A portion of the HEP train line 108 extending between the end 109 of the first vehicle 102 and the end 110 of the second vehicle 104 has an inductance represented by numeral 113. This portion of the HEP train line may be referred to as a HEP interconnecting train line 114. The value of the inductance 113 is dependent on the geometry of the HEP interconnecting train line 114, such as but not limited to, length, radius, and the like of the HEP interconnecting train line 114.

Further, the first vehicle 102 includes a first power converting subunit 115. In the illustrated embodiment, the first power converting subunit 115 includes first inverters 116, 118. The second vehicle 104 includes a second power converting subunit 117. The second power converting subunit 117 includes second inverters 120, 122. In an alternative embodiment, each of the first power converting subunit 115 and the second power converting subunit 117 includes an alternator. Further, although each of the vehicles 102, 104 includes only two inverters, in other embodiments, number of inverters of each of the vehicles may vary depending on the application.

Each of the first and second inverters 116, 118, 120, 122 includes a plurality of switches (not shown in FIG. 1). In such an embodiment, each of the plurality of switches may be a semiconductor switch. In one embodiment, the semiconductor switch includes an insulated gate bipolar transistor, a metal oxide semiconductor field effect transistor, a field-effect transistor, an injection enhanced gate transistor, an integrated gate commutated thyristor, or the like. In another embodiment, the semiconductor switch includes a gallium nitride based switch, a silicon carbide based switch, a gallium arsenide based switch, or the like.

The first inverters 116, 118 are coupled to corresponding first control units 124, 126. The second inverters 120, 122 are coupled to corresponding second control units 128, 130. The operation of the first inverters 116 and 118 are controlled by the first control units 124, 126 respectively. Further, the operation of the second inverters 120 and 122 are controlled by the second control units 128, 130, respectively. The term "operation of the inverter," as used herein, specifically refers to operation of the switches of each of the first and second inverters 116, 118, 120, 122 to generate a desired output. The desired output may be a desired value of a voltage or a current.

The first control units 124, 126 of the first vehicle 102 are communicatively coupled to each other. Similarly, second control units 128, 130 of the second vehicle 104 are communicatively coupled to each other. In certain embodiments, each of the first and second control units 124, 126, 128, 130 includes one or more processors (not shown in FIG. 1). The processors perform the functions of the control units 124, 126, 128, 130. As used herein, the term "control unit" may refer to integrated circuits included in a computer, a controller, a microcontroller, a microcomputer, a programmable logic controller (PLC), a specification specific integrated circuit, specification-specific processor, digital signal processors (DSPs), Application Specific Integrated Circuits (ASICs), Field Programmable Gate Arrays (FPGAs), and/or any other programmable circuits.

Additionally, the first vehicle 102 includes first sensors 132 disposed at corresponding first locations 134. The first sensors 132 are used to measure current or voltage corresponding to the first locations 134. The second vehicle 104 includes second sensors 136 disposed at corresponding second locations 138. The second sensors 136 are used to measure current or voltage corresponding to the second locations 138. The terms "first and second locations," as used herein, refers to locations of electrical nodes.

The first sensors 132 are coupled to the first control units 124, 126. Further, the second sensors 136 are coupled to the second control units 128, 130. The first and second sensors 132, 136 may include voltage sensors and current sensors. In one embodiment, at least one of the second sensors 136 measure a quantity of electrical output current flowing through the load 106.

In one embodiment, the first inverters 116, 118 are controlled by the first control units 124, 126, respectively, based on output of the first sensors 132. Further, the second inverters 120, 122 are controlled by the second control units 128 and 130, respectively, based on output of the second sensors 136. In one specific embodiment, the second inverters 120, 122 are controlled by the second control units 128 and 130, respectively, based on the quantity of the electrical output current flowing through the load 106 measured by at least one second sensor 136.

In the illustrated embodiment where the first vehicle 102 is the lead vehicle, the first inverter 116 regulates a corresponding output voltage. Further, the first inverter 118 and second inverters 120, 122 regulate a corresponding output current. In one specific embodiment, the second inverters 120, 122 are controlled by the second control units 128 and 130, respectively, based on the measured quantity of the electrical output current flowing through the load 106 such that the second inverters 120 and 122 provide about 50% of the total current required by the load 106. Hence, the first inverters 116, 118 need to provide the remaining 50% of the total current required by the load 106. Particularly, the quantity of electrical output current flowing through the load 106 is shared among the first and second inverters 116, 118, 120, 122 of the first and second vehicles 102, 104. More particularly, the head end power to be provided to the load 106 is shared among the first and second inverters 116, 118, 120, 122 of the first and second vehicles 102, 104.

In one embodiment, the quantity of the electrical output current flowing through the load 106 is equally shared among the first and second inverters 116, 118, 120, 122 of the first and second vehicles 102, 104. In another embodiment, the quantity of the electrical output current flowing through the load 106 is shared unequally among the first and second inverters 116, 118, 120, 122 of the first and second vehicles 102, 104. In a specific embodiment, the quantity of the electrical output current flowing through the load 106 is shared among the first and second inverters 116, 118, 120, 122 of the first and second vehicles 102, 104 without any communication between the first and second vehicles 102, 104. In another embodiment, there may be intra-vehicle communication, and/or there may be communication between the first and second vehicles 102, 104 and an offboard location that relays such information back to the first and second vehicles 102, 104. The method of sharing of the power provided to the load 106 is explained in greater detail below with reference to subsequent figures.

Additionally, with reference to the first vehicle 102, the first control units 124, 126 control pulse width modulation of the first inverters 116, 118 respectively, using corresponding carrier waves. Similarly, with reference to the second vehicle 104, the second control units 128, 130 control pulse width modulation of the second inverters 120, 122, respectively using corresponding carrier waves. The carrier waves used for pulse width modulation of the first inverters 116, 118 and the carrier waves used for pulse width modulation of the second inverters 120, 122 are not mutually synchronized due to lack of communication between the first and second vehicles 102, 104. As a result, a high frequency circulating harmonic current may flow between the first vehicle 102 and the second vehicle 104. It should be noted herein that the terms 'high frequency harmonic current' and 'high frequency circulating harmonic current' may be used interchangeably. The frequency of the circulating harmonic current is dependent on a switching frequency of the switches of the first and second inverters 116, 118, 120, 122. In one embodiment, the frequency of the circulating harmonic current may be a harmonic component of the switching frequency of the switches of the first and second inverters 116, 118, 120, 122.

In one embodiment, the carrier waves used for pulse width modulation of the first inverters 116, 118 and carrier waves used for pulse width modulation of the second inverters 120, 122 are mutually synchronized by changing time-period of at least one switching cycle of the carrier waves used for pulse width modulation of the second inverters 120, 122 based on measurement of a high frequency circulating harmonic current. To state differently, the carrier waves corresponding to the first vehicle 102 is synchronized with the carrier waves corresponding to the second vehicle 104 by changing time-period of at least one switching cycle of the carrier waves of the second vehicle 104 based on the measured high frequency harmonic circulating current. In one embodiment, if the time period of one switching cycle of the carrier waves used for pulse width modulation of the second inverters 120, 122 is represented by Ts, the time period of at least one switching cycle of the carrier waves used for pulse width modulation of the second inverters 120, 122 is changed from Ts to Ts+$\Delta$Ts. In another embodiment, the time period of at least one switching cycle of the carrier waves used for pulse width modulation of the second inverters 120, 122 is changed from Ts to Ts−$\Delta$Ts. Subsequent to change of time period for one or more switching cycles of the carrier waves used for pulse width modulation of the second inverters 120, 122, the carrier waves used for pulse width modulation of the first inverters 116, 118 and carrier waves used for pulse width modulation of the second inverters 120, 122 are mutually synchronized.

The term "synchronization of carrier waves" as used herein, refers to alignment of carrier waves of inverters of one vehicle with carrier waves of inverters of other vehicles. In the illustrated embodiment, carrier waves corresponding to the first vehicle 102 are synchronized with carrier waves corresponding to the second vehicle 104. The synchronizing of carrier waves aids in limiting any high frequency circulating harmonic current between capacitors (not shown in FIG. 1) of the first and second vehicles 102, 104. Accordingly, the high frequency harmonic current circulating between the first and the second vehicles is reduced to less than or equal to a threshold value. In the illustrated embodiment, no communication is required between the first vehicle 102 and the second vehicle 104.

Although in the illustrated embodiment of FIG. 1 only two vehicles 102, 104 are disclosed, in other embodiments, the number of vehicles may vary depending on the application. Furthermore, although the embodiment of FIG. 1 discloses a single phase, in other embodiments, the power system may include a plurality of phases. Further, although power system 100 of FIG. 1 discloses only the first and second inverters 116, 118, 120, 122 which provide head end power to the load 106, use of additional auxiliary converters and traction converters are also envisioned.

Figure 2:
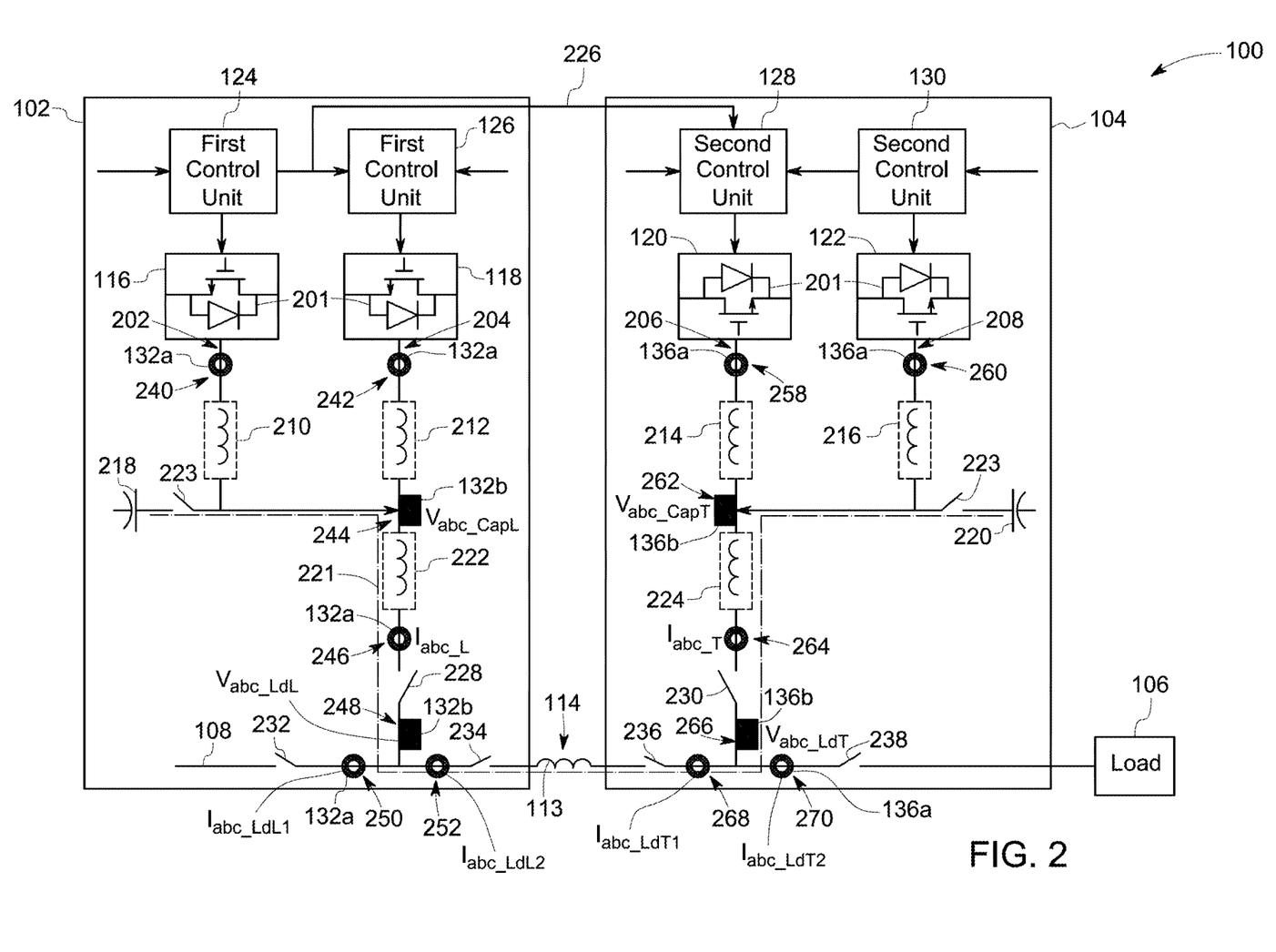
FIG. 2 is a detailed diagrammatical representation of one phase of a power system in accordance with the embodiment of FIG. 1.

Referring now to FIG. 2, a detailed diagrammatical representation of one phase of the power system 100 in accordance with certain embodiments of the present invention is depicted. In one embodiment, the power system 100 is a locomotive power system.

The power system 100 includes the first and second vehicles 102, 104. The first vehicle 102 includes the first inverters 116, 118 coupled in parallel to each other. Further, the second vehicle 104 includes the second inverters 120, 122 coupled in parallel to each other. For the ease of illustration, the first inverters 116, 118 and the second inverters 120, 122 are represented using a single switch 201. Within the first vehicle 102, each of the first inverters 116, 118 generate at least one of an output voltage and an output current. Further, within the second vehicle 104, each of the second inverters 120, 122 generate at least one of an output voltage and an output current.

Reference numeral 202 represents an output end of the first inverter 116. Further, the reference numeral 204 represents an output end of the first inverter 118. Reference numeral 206 represents an output end of the second inverter 120 and reference numeral 208 represents an output end of the second inverter 122. In one embodiment, each of the output ends 202, 204, 206, 208 includes three AC phase terminals.

Further, the first vehicle 102 includes a first inductor 210. The first inductor 210 is coupled to the output end 202 of the first inverter 116. Additionally, the first vehicle 102 includes another first inductor 212. The first inductor 212 is coupled to the output end 204 of the first inverter 118. The second vehicle 104 includes a first inductor 214. The first inductor 214 is coupled to the output end 206 of the second inverter 120. Additionally, the second vehicle 104 includes another first inductor 216. The first inductor 216 is coupled to the output end 208 of the second inverter 122.

Additionally, the first vehicle 102 includes a first capacitor 218. The first capacitor 218 is coupled to the output ends 202, 204 of the first inverters 116, 118. Further, the first capacitor 218 is coupled to the first inductors 210, 212. The first inductors 210, 212 and with first capacitor 218 is referred to as a first filter. Similarly, the second vehicle 104 includes a second capacitor 220. The second capacitor 220 is coupled to the output ends 206, 208 of the second inverters 120, 122. Further, the second capacitor 220 is coupled to the first inductors 214, 216. The first inductors 214, 216 and the second capacitor 220 forms a second filter.

Additionally, a resonant circuit 221 is formed between the first and second vehicles 102, 104. In particular, the resonant circuit 221 is formed by coupling the first capacitor 218 to the second capacitor 220 via the HEP interconnecting train line 114 having the inductance 113.

The resonant circuit 221 provides a low impedance path to harmonics of the switching frequency when the value of a resonant frequency is substantially same as a value of the switching frequency of switches 201 of the first or second inverters 116, 118, 120, 122 and corresponding harmonics of the switching frequency. As a result, the high frequency circulating harmonic current flows between the capacitors 218, 220 of the first and second vehicles 102, 104. In such a scenario, the impedance of the resonant circuit 221 is modified by adding/removing capacitors/inductors from the resonant circuit 221 to shift the resonant frequency from the switching frequency of switches 201 of the first or second inverters 116, 118, 120, 122. Accordingly, the high frequency circulating harmonic current flowing between the capacitors 218, 220 of the first and second vehicles 102, 104 is limited.

In illustrated embodiment, the first vehicle 102 includes a current limiting device such as a second inductor 222. Further, the second vehicle 104 includes a current limiting device such as another second inductor 224. The second inductors 222, 224 are coupled in series to the resonant circuit 221. The coupling of the second inductors 222, 224 in series to the resonant circuit 221 shifts resonant frequency from a switching frequency of the switches 201 of the first or second inverters 116, 118, 120, 122 and corresponding harmonics of the switching frequency, thereby limiting flow of high frequency circulating harmonic current between the first and second vehicles 102, 104.

In another embodiment, at least one capacitor of the first and second capacitors 218, 220 is decoupled from the resonant circuit 221, using a switch 223. Accordingly, the resonant circuit 221 is eliminated.

In yet another embodiment, in order to limit the high frequency circulating harmonic current, a synchronizing line 226 (for example, a communication line) is used to couple the first control units 124, 126 to the second control units 128, 130. The use of the synchronizing line 226 enables to synchronize the carrier waves corresponding to the first vehicle 102 to the carrier waves corresponding to the second vehicle 104. As a result, the high frequency circulating harmonic current is minimized. The synchronizing line 226 and the HEP interconnecting train line 114 may be referred to as a common bus.

In one embodiment, if the synchronizing line 226 is used, the value of inductance of the second inductors 222, 224 is negligible. In another embodiment, if the synchronizing line 226 is used, the second inductors 222, 224 may not be employed. Thus, the cost and footprint of the second inductors 222, 224 may be reduced/avoided. In one embodiment, if the synchronizing line 226 is not used, value of inductance of the second inductors 222, 224 is high. In another embodiment, if the capacitors 218, 220 are decoupled from the resonant circuit 221, the synchronizing line 226 may not be employed. In yet another embodiment, if the carrier waves corresponding to the first vehicle 102 is synchronized with the carrier waves corresponding to the second vehicle 104 by changing time-period of at least one switching cycle of the carrier waves of the second vehicle 104 based on the measured high frequency harmonic circulating current, the value of inductance of the second inductors 222, 224 is negligible. In such an embodiment, the use of a synchronizing line 226 is avoided.

Additionally, the first and second vehicles 102, 104 include first and second converter breakers 228, 230 respectively. Further, the first vehicle 102 includes first switches/breakers 232, 234 and the second vehicle 104 includes second switches/breakers 236, 238. The first and second converter breakers 228, 230 and the first and second switches/breakers 232, 234, 236, 238 enable to establish or terminate an electrical connection between the first and second vehicles 102, 104. Additionally, the first and second converter breakers 228, 230 and the first and second switches/breakers 232, 234, 236, 238 enable to establish or terminate an electrical connection between the first and second vehicles 102, 104 and the load 106.

In the illustrated embodiment, the first locations of the first sensors 132 are represented by reference numerals 240, 242, 244, 246, 248, 250, 252. The reference numeral 240 represents a location of the output end 202 of the first inverter 116 and the reference numeral 242 represents a location of the output end 204 of the first inverter 118. Specifically, the first locations 240, 242 may be referred to as first inverter output locations. Further, the reference numeral 244 represents a location proximate to the first capacitor 218 of the first vehicle 102. Specifically, the first location 244 may be referred to as a first capacitor location. The reference numerals 246, 248 are representative of locations proximate to the first converter breaker 228. In particular, the reference numeral 246 represents a location proximate to the first converter breaker 228 and towards first inverters 116, 118. The reference numeral 248 represents a location proximate to the first converter breaker 228 and towards the HEP train line 108. Specifically, the first locations 246, 248 may be referred to as first converter breaker locations. The reference numerals 250, 252 represent two locations along the HEP train line 108. Specifically, the first locations 250, 252 may be referred to as first train line locations.

Within the first vehicle 102, first sensors 132 are disposed at the first locations 240, 242, 244, 246, 248, 250, 252. The first sensors 132 include first current sensors 132a and first voltage sensors 132b. Particularly, the first current sensors 132a are disposed at the first locations 240, 242, 246, 250, 252. Further, the first voltage sensors 132b are disposed at the first locations 244, 248.

Second locations of the second sensors 136 are represented by reference numerals 258, 260, 262, 264, 266, 268, and 270. The reference numeral 258 represents a location at the output end 206 of the second inverter 120 and the reference numeral 260 represents a location of the output end 208 of the second inverter 122. Specifically, the second locations 258, 260 may be referred to as second inverter output locations. Further, the reference numeral 262 represents a location proximate to the second capacitor 220. Specifically, the second location 262 may be referred to as a second capacitor location. The reference numerals 264, 266 are representative of locations proximate to the second converter breaker 230. In particular, the reference numeral 264 represents a location proximate to the second converter breaker 230 and towards second inverters 120, 122. Further, the reference numeral 266 represents a location proximate to the second converter breaker 230 and towards the HEP train line 108. Specifically, the second locations 264, 266 may be referred to as second converter breaker locations. The reference numerals 268, 270 represent two locations respectively along the HEP train line 108. Specifically, the second locations 268, 270 may be referred to as second train line locations.

Within the second vehicle 104, the second sensors 136 are disposed at the second locations 258, 260, 262, 264, 266, 268, and 270. The second sensors 136 include second current sensors 136*a* and second voltage sensors 136*b*. The second current sensors 136*a* are disposed at the second locations 258, 260, 264, 268, 270. Further, the second voltage sensors 136*b* are disposed at the second locations 262, 266.

The first current and voltage sensors 132*a*, 132*b* of the first vehicle 102 are coupled to the first control units 124, 126. Further, the second current and voltage sensors 136*a*, 136*b* of the second vehicle 104 are coupled to the second control units 128, 130. The current and voltage measurement by the first current and voltage sensors 254, 256, of the first vehicle 102 is not communicated to the second vehicle 104 and vice versa.

As noted with respect to FIG. 1, the operation of the first inverters 116, 118 is controlled by the first control units 124, 126. Further, the operation of the second inverters 120 and 122 is controlled by the second control units 128, 130.

Additionally, the first and second control units 124, 126, 128, 130 facilitates to establish an electrical connection between the first vehicle 102 and the second vehicle 104. When the operation of the power system 100 is initiated, the first converter breaker 228 is in a closed state and the first switch/breaker 234 is in a closed state. Further, the second switches/breakers 236, 238 are in a closed state, and the second converter breaker 230 is in an open state. In accordance with the illustrated embodiment, only the first vehicle 102 is used to provide electric power to the load 106.

After a predetermined time duration, for example, 0.5 seconds, in one embodiment, the second vehicle 104 also starts providing electric power to the load 106. In particular, the electric power provided to the load 106 is shared by the first and second vehicles 102, 104. Such sharing of the electric power by the first and second vehicles 102, 104 is possible only if the first and second vehicles 102, 104 are electrically coupled to each other and to the load 106. In particular, the second converter breaker 230 needs to be in a closed state for electrically coupling the first and second vehicles 102, 104 to each other and to the load 106.

The first vehicle 102 needs to be synchronized with the second vehicle 104 before establishing the electrical connection between the first vehicle 102 and the second vehicle 104. Particularly, a voltage $V_{abc\_CapT}$ needs to be synchronized with a voltage $V_{abc\_LdT}$. More particularly, a phase and a magnitude of the voltage $V_{abc\_CapT}$ needs to be synchronized with a phase and a magnitude of the voltage of the voltage $V_{abc\_LdT}$. The voltage $V_{abc\_LdT}$ may be referred to as a first voltage and the voltage $V_{abc\_CapT}$ may be referred to as a second voltage. The voltage $V_{abc\_LdT}$ may be referred to as a quantity of output voltage of the vehicle 102. The voltage $V_{abc\_CapT}$ may be referred to as a voltage of the second capacitor 220. In one embodiment, the voltage $V_{abc\_CapT}$ is measured using the second voltage sensor 136*b* disposed at the second capacitor location 262 of the second vehicle 104. Further, the voltage $V_{abc\_LdT}$ is measured using the second voltage sensor 136*b* disposed at the second converter breaker location 266 of the second vehicle 104.

Further, a phase lock loop is employed to lock a phase and a magnitude of the voltage $V_{abc\_CapT}$ with a phase and a magnitude of the voltage $V_{abc\_CapT}$. When the phase and the magnitude of the voltage $V_{abc\_CapT}$ is locked with the phase and the magnitude of the voltage $V_{abc\_LdT}$, the voltage $V_{abc\_CapT}$ is synchronized with the voltage $V_{abc\_LdT}$. The locking of the phase and magnitude of the voltage $V_{abc\_CapT}$ with the phase and magnitude of the voltage $V_{abc\_LdT}$ refers to a condition when the phase and the magnitude of the voltage $V_{abc\_CapT}$ is same as the phase and the magnitude of $V_{abc\_LdT}$. When the voltage $V_{abc\_CapT}$ pr is synchronized with the voltage $V_{abc\_LdT}$, the second converter breaker 230 is closed. Accordingly, the vehicle 102 is electrically coupled to the vehicle 104. In one embodiment, when the first and the second vehicles 102, 104 are synchronized, both the first and second vehicles 102, 104 share electric power provided to the load 106. In another embodiment, even after synchronization of the first and the second vehicles 102, 104, only the first vehicle 102 provides electric power to the load 106 and the second vehicle 104 provides electric power to the load 106 only if the total electric power to be provided to the load 106 is above a determined value of electric power.

In addition, the first and second control units 124, 126, 128, 130 of the corresponding first and second vehicles 102, 104 input a plurality of operational parameters corresponding to each of the first and second vehicles 102, 104. The plurality of operational parameters includes an assigned lead position of a vehicle, an assigned trail position of a vehicle, number of inverters in each of the vehicles, an assigned position of each inverter among inverters of each of the vehicles, and number of vehicles.

In one embodiment, operational parameters such as but not limited to an assigned lead position or a trail position of the first vehicle 102, number of inverters in the first vehicle 102, assigned position of each inverter of the first vehicle 102, and number of vehicles are input to the first control units 124, 126. Similarly, operational parameters such as but not limited to an assigned lead position or an assigned trail position of the second vehicle 104, number of inverters in the second vehicle 104, assigned position of each inverter of the second vehicle 104, and number of vehicles are input to the second control units 128, 130. In one embodiment, the trail vehicle may be coupled to the load 106 and the head end power to be provided to the load 106 is provided by a combination of the lead vehicle and the trail vehicle.

It should be noted herein that a vehicle which is assigned the lead position operates as a lead vehicle. For example, for an integer value k, where k=1 is assigned corresponding to a vehicle which is assigned a lead position. The vehicles which are assigned trail positions operate as trail vehicles. For example, for an integer value k, where k≥2 is assigned corresponding to the vehicles which are assigned the trail position. For example, if the first vehicle 102 is assumed to operate as a lead vehicle and the second vehicle 104 operates as a trail vehicle, an integer value 1 is assigned to the first vehicle 102 and an integer value 2 is assigned to the second vehicle 104.

The term "assigned position of each inverter," as used herein, refers to a functionality of an inverter. The functionality of the inverter is characterized by whether an inverter controls current or voltage. In another embodiment, the functionality of inverter is characterized by whether an inverter is a master inverter or a slave inverter. In one embodiment, the first and second inverters 116, 120 operate as master inverters and the first and second inverters 118, 122 operate as slave inverters. Further, in one embodiment the first inverter 116 controls output voltage and the first inverter 118 and the second inverters 120, 122 control output current.

For example, the first control unit 124 regulates voltage of the first capacitor 218 of the vehicle 102 to a predefined value, using the first inverter 116, where the first inverter 116 operates as the master inverter. Further, the first control unit 126 controls a current generated by the first inverter 118 of the first vehicle 102.

Further, in an embodiment, where both the first and second vehicles provide power to the load 106, the second control units 128, 130 control operation of the second inverters 120, 122 of the second vehicle 104 based on a current $I_{abc\_LdT2}$ measured by the second current sensor 130a at the second train line location 270. The current $I_{abc\_LdT2}$ is a measure of the quantity of the electrical output current flowing through the load 106. The measured current $I_{abc\_LdT2}$ and voltage $V_{abc\_CapT}$ are input to the second control units 128, 130. The current flowing through the second capacitor 220 is determined by the second control units 128, 130 based on the voltage $V_{abc\_CapT}$ of the second capacitor 220 and a value of capacitance of the second capacitor 220. The second inverters 120, 122 are controlled based on the measured current $I_{abc\_LdT2}$ and voltage $V_{abc\_CapT}$, such that each of the second inverters 120, 122 generate a current which is a sum of half of the current flowing through the second capacitor 220 and one fourth of the measured current $I_{abc\_LdT2}$. Accordingly, the second inverters 120, 122 together provide a current having a value of about $$\frac{I_{abc\_LdT2}}{2}.$$

The first vehicle 102 needs to provide about a current having a value of $$\frac{I_{abc\_LdT2}}{2}$$

since, the second inverters 120, 122 together provide a current having a value of about $$\frac{I_{abc\_LdT2}}{2}.$$

Thus, a quantity of output current of the first vehicle 102 at the first train line location 252, is $$\frac{I_{abc\_LdT2}}{2}.$$

In the illustrated embodiment, a voltage $V_{abc\_CapL}$ is measured using the first voltage sensor 132b. The voltage $V_{abc\_CapL}$ may be referred to as the voltage of the first capacitor 218. The current $I_{abc\_LdL2}$ and the voltage $V_{abc\_CapL}$ are input to the first control units 124, 126. The current flowing through the first capacitor 218 is determined by the first control units 124, 126, based on the voltage $V_{abc\_CapL}$ and the value of capacitance of the first capacitor 218.

The first inverter 118 is controlled by the first control unit 126 based on the current $I_{abc\_LdL2}$ and the voltage $V_{abc\_CapL}$ such that the current generated by the first inverter 118 is a sum of half of the value of current flowing through the first capacitor 218 and the current $$\frac{I_{abc\_LdL2}}{2}.$$

Accordingly, the first inverter 116 needs to provide a current which is a sum of half of the value of current flowing through first capacitor 218 and the current $$\frac{I_{abc\_LdL2}}{2}.$$

Hence the current $I_{abc\_LdL2}$ is shared among the first inverters 116, 118. Further, the current flowing through the first capacitor 218 is shared among the first inverters 116, 118.

As a result, the first inverters 116, 118 of the first vehicles 102 and the second inverters 120, 122 of the second vehicle 104 equally share the quantity of output electrical current provided to the load 106. In another embodiment, the first inverters 116, 118 of the first vehicles 102 and the second inverters 120, 122 of the second vehicle 104 unequally share the quantity of output electrical current provided to the load 106.

Figure 3:
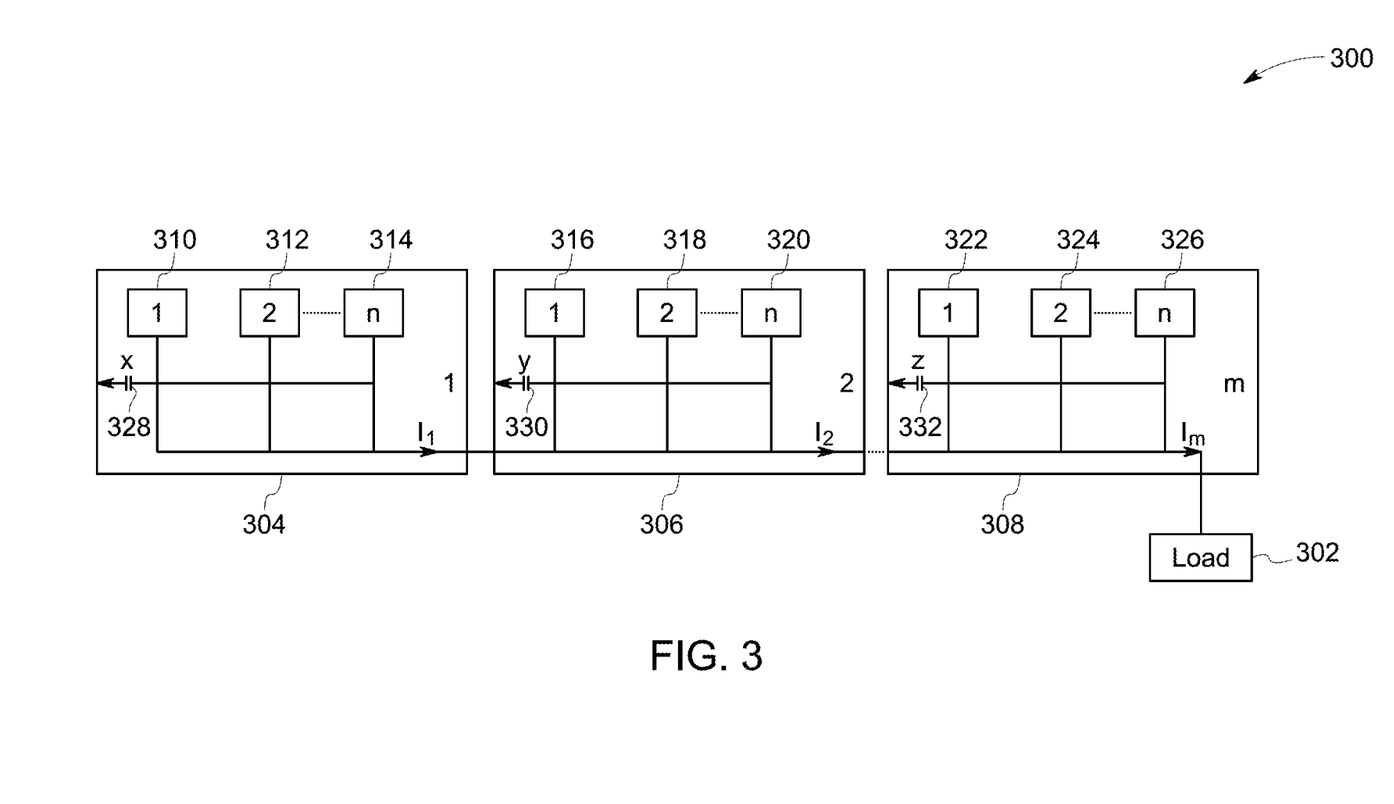
FIG. 3 is a detailed diagrammatical representation of a power system, in accordance with an exemplary embodiment.

FIG. 3 is a detailed diagrammatical representation of a power system 300 in accordance with an exemplary embodiment of the present invention. In the illustrated embodiment, the power system 300 includes 'm' vehicles, where each vehicle includes 'n' inverters, where m and n are integer values and m>1 and n≥1. In particular, current provided to a load 302 is shared by 'n' inverters corresponding to each of the 'm' vehicles.

For the ease of representation, in the illustrated embodiment, only the first vehicle, the second vehicle, and the $m^{th}$ vehicle are represented. The first, second, and $m^{th}$ vehicles are represented by reference numerals 304, 306, 308 respectively. In the illustrated embodiment, the first vehicle 304 is a lead vehicle and the second and $m^{th}$ vehicles 306, 308 are trail vehicles. For an integer value k, where k≥1 is assigned to the corresponding vehicle based on the assigned lead or trail position of the corresponding vehicle. For example, an integer value 1 is assigned to the first vehicle 304, an integer value 2 is assigned to the second vehicle 306.

Further, for ease of illustration, within each of the vehicles, only the first inverter, the second inverter, and the $n^{th}$ inverter are depicted. The first, second, and $n^{th}$ inverters of the first vehicle 304 are represented by reference numerals 310, 312, 314 respectively. The first, second, and n$^{th}$ inverters of the second vehicle 306 are represented by reference numerals 316, 318, 320 respectively. Additionally, the first, second, and n$^{th}$ inverters of the m$^{th}$ vehicle 308 are represented by reference numerals 322, 324, 326 respectively. Each of the vehicles 304, 306, 308 includes a capacitor represented by reference numerals 328, 330, 332, respectively.

A quantity of electrical output current of the vehicle 304 is represented as $I_1$. Further, current flowing through the capacitor 328 is represented as x. Accordingly, current generated by each inverter of the vehicle 304 is represented by the relation:

$$\frac{I_1}{\left(\begin{array}{c}\text{assigned integer value of vehicle } 304 \times \\ \text{number of inverters in the vehicle } 304\end{array}\right)} + \frac{x}{\text{number of inverters in the vehicle } 304} \quad (1)$$

A quantity of electrical output current of the vehicle 306 is represented as $I_2$. Further, current flowing through the capacitor 330 is represented as y. Accordingly, current generated by each inverter of the vehicle 306 is represented by relation (2).

$$\frac{I_2}{\left(\begin{array}{c}\text{assigned integer value of vehicle } 306 \times \\ \text{number of inverters in the vehicle } 306\end{array}\right)} + \frac{y}{\text{number of inverters in the vehicle } 306} \quad (2)$$

A quantity of electrical output current of the vehicle 308 is represented as $I_m$. Further, current through the capacitor 332 is represented as z. Accordingly, current generated by each inverter of the vehicle 308 is represented by relation (3).

$$\frac{I_m}{\text{assigned integer value of vehicle } 308 \times \text{number of inverters in the vehicle } 308} + \frac{z}{\text{number of inverters in the vehicle } 308} \quad (3)$$

According to embodiments of the present invention, the current $I_m$ flows through the load 302. In one embodiment, the current $I_m$ flowing through the load 302 is shared equally by the inverters of the first, second, third . . . and m$^{th}$ vehicles. In particular, the electric power provided to the load 302 is shared equally among the inverters of the first, second, third . . . and m$^{th}$ vehicles. In another embodiment, the power provided to the load 302 is shared unequally among the inverters of the first, second, third . . . and m$^{th}$ vehicles.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are active and/or passive and are connected or otherwise coupled together to provide the described function. In addition, the term "operatively coupled," as used herein, includes wired coupling, wireless coupling, electrical coupling, magnetic coupling, radio communication, software based communication, or combinations thereof.

The exemplary process steps such as those that may be performed by the exemplary system may be implemented by suitable code on a processor-based system such as a general-purpose or special-purpose computer. It should also be noted herein that different exemplary implementations may perform some or all of the steps described herein in different orders or substantially concurrently. Furthermore, the functions may be implemented in a variety of programming languages including but not limited to C++ or Java. Such code may be stored or adapted for storage on one or more tangible, machine readable media such as on data repository chips, local or remote hard disks, optical disks (that is, CDs or DVDs), memory or other media, which may be accessed by a processor-based system to execute the stored code. The tangible media may include paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

In accordance with the embodiments discussed herein, the exemplary power system having a plurality of power generating units and the method of operating the power system enables sharing electric power to be provided to the load between the plurality of power generating units of the power system. In particular, the exemplary system and method enables sharing head end power provided to the load among the power converting subunits of the plurality of power generating units of the power system. Further, the system and method uses sensors in respective power generating units to control operation of the power converting subunits of the respective power generating units. The data measured by the sensors of one power generating unit is not communicated to the other power generating unit. Accordingly, control of the power system is simpler and efficient. Further, the power rating of the power converting subunits used in the power generating units is a nominal value, since the head end power to be provided to the load is shared between the plurality of power generating units of the power system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A power system comprising:
a lead unit comprising:
a first power converting subunit;
a first control unit coupled to the first power converting subunit, wherein the first control unit is configured to regulate a first voltage and to control a current of the lead unit; and
at least one first inductor and at least one first capacitor operatively coupled to an output end of the first power converting subunit; and
a remote unit coupled to the lead unit and a load, wherein the remote unit comprises:
a second power converting subunit;
a second control unit coupled to the second power converting subunit, wherein the second control unit is configured to control operation of the second power converting subunit based on the current of the lead unit and the load, wherein the second control unit is configured to control a current of the remote unit to share a quantity of electrical output current flowing through the load among the lead and remote units; and
at least one first inductor and at least one first capacitor operatively coupled to an output end of the second power converting subunit,
wherein a phase of the first voltage of the lead unit measured by a sensor onboard the remote unit is configured to be synchronized with a phase of a second voltage of the remote unit measured at the at least one first capacitor of the remote unit, wherein a converter breaker of the remote unit is configured to close responsive to synchronizing the phase of the first voltage of the lead unit with the phase of the second voltage of the remote unit, and
wherein the second control unit is configured to change operation of the second power converting subunit to change an amount of electric output current generated by the second power converting subunit based on an amount of the electrical output current of the lead unit.

2. The power system of claim 1, wherein each of the lead and remote units is a vehicle.

3. The power system of claim 2, wherein each of the vehicles is a locomotive.

4. The power system of claim 1, wherein the second control unit is configured to control the current of the remote unit to equally share the quantity of electrical output current flowing through the load among the first power converting subunit and the second power converting subunit.

5. The power system of claim 1, wherein the second control unit is configured to control the current of the remote unit to unequally share the quantity of electrical output current flowing through the load among the first power converting subunit and the second power converting subunit.

6. The power system of claim 1, wherein the lead unit comprises a first sensor disposed at a first location and the remote unit comprises a second sensor disposed at a second location.

7. The power system of claim 6, wherein the first sensor is coupled to the first control unit.

8. The power system of claim 6, wherein the second sensor is coupled to the second control unit.

9. The power system of claim 6, wherein the second control unit is configured to control the current of the remote unit based on the quantity of electrical output current flowing through the load detected by the second sensor.

10. The power system of claim 1, further comprising a common bus configured to couple the lead unit to the remote unit.

11. The power system of claim 10, wherein the common bus comprises at least one of a head end power (HEP) interconnecting line, and a synchronizing line.

12. The power system of claim 1, wherein the at least one first inductor and the at least one first capacitor of each of the lead and remote units correspond to each alternating current phase of the corresponding first and second power converting subunits.

13. The power system of claim 12, wherein lead unit further comprises a converter breaker, wherein each of the lead and remote units further comprises at least one second inductor corresponding to each alternating current phase, operatively coupled to the corresponding at least one first capacitor and the converter breaker of each of the lead unit and the remote unit, respectively.

14. The power system of claim 1, wherein the first and second control units are configured to input a plurality of operational parameters.

15. The power system of claim 1, wherein the first and second power converting subunits are at least one of an alternator and an inverter.

16. The power system of claim 1, wherein the lead unit includes circuitry that is configured to operate at a same electrical power frequency as electrical equipment of the remote unit.

17. A method of operating a power system, the method comprising:
regulating a first voltage of a lead unit, using a first control unit of the lead unit, wherein a remote unit is coupled to the lead unit and a load, wherein the lead unit further comprises a first power converting subunit coupled to the first control unit and at least one first inductor and at least one first capacitor operatively coupled to an output end of the first power converting subunit, the remote unit comprising a second power converting subunit coupled to a second control unit and at least one first inductor and at least one first capacitor operatively coupled to an output end of the second power converting subunit;
synchronizing a phase of the first voltage of the lead unit measured by a sensor onboard the remote unit with a phase of a second voltage of the remote unit measured at the at least one first capacitor of the remote unit, wherein a converter breaker of the remote unit is configured to close responsive to synchronizing the phase of the first voltage of the lead unit with the phase of the second voltage of the remote unit;
controlling a current of the lead unit using the first control unit; and
controlling a current of the remote unit to share a quantity of electrical output current flowing through the load among the lead and remote units based on the current of the lead unit and the load, using the second control unit, wherein the remote unit is configured to change an amount of current of the remote unit based on an amount of current of the lead unit.

18. The method of claim 17, wherein controlling the current of the remote unit comprises equally sharing the quantity of electrical output current flowing through the load among the first power converting subunit and the second power converting subunit.

19. The method of claim 17, wherein controlling the current of the remote unit comprises unequally sharing the quantity of electrical output current flowing through the load among first power converting subunit and the second power converting subunit.

20. The method of claim 17, further comprising reducing a high frequency harmonic current circulating between the lead unit and the remote unit to less than or equal to a threshold value.

21. The method of claim 20, wherein reducing the high frequency harmonic current circulating between the lead unit and the remote unit comprises synchronizing carrier waves used for modulation of the first power converting subunit with corresponding carrier waves used for modulation of the second power converting subunit.

22. The method of claim 21, wherein synchronizing the carrier waves used for modulation of the first power converting subunit with the corresponding carrier waves used for modulation of the second power converting subunit comprises changing a time-period of at least one switching cycle of the carrier waves used for modulation of the second power converting subunit.

23. The method of claim 20, wherein reducing the high frequency harmonic current circulating between the lead unit and the remote unit further comprises modifying an impedance of a resonant circuit formed between the lead and remote units.

24. The power system of claim 1, wherein the second control unit is configured to synchronize carrier waves used for modulation of the first power converting subunit with corresponding carrier waves used for modulation of the second power converting subunit to reduce a high frequency harmonic current circulating between the lead unit and the remote unit, wherein synchronizing the carrier waves used for modulation of the first power converting subunit with the corresponding carrier waves used for modulation of the second power converting subunit comprises changing a time-period of at least one switching cycle of the carrier waves used for modulation of the second power converting subunit.

* * * * *